United States Patent [19]

Lane

[11] Patent Number: 4,573,889
[45] Date of Patent: Mar. 4, 1986

[54] BEARINGS FOR GEAR PUMPS

[75] Inventor: Jeffrey A. Lane, West Midlands, England

[73] Assignee: Lucas Industries, Ltd., Birmingham, England

[21] Appl. No.: 549,680

[22] Filed: Nov. 7, 1983

[30] Foreign Application Priority Data

Nov. 10, 1982 [GB] United Kingdom ................. 8232053

[51] Int. Cl.⁴ ........................ F04C 29/02; F16C 32/06
[52] U.S. Cl. ...................................... 418/73; 418/102; 384/111; 384/113
[58] Field of Search ........................... 418/71, 73, 102; 384/111, 113

[56] References Cited

U.S. PATENT DOCUMENTS

| 2,479,077 | 8/1949 | McAlvay | 418/102 X |
| 2,891,483 | 6/1959 | Murray et al. | 418/73 X |
| 3,053,192 | 9/1962 | Nonnenmacher | 418/73 |
| 3,528,756 | 9/1970 | Norlin et al. | 418/73 |
| 3,671,155 | 6/1972 | Dubinsky | 418/73 |
| 4,090,820 | 5/1978 | Teruyama | 418/102 X |

FOREIGN PATENT DOCUMENTS

| 888982 | 12/1943 | France | 418/73 |
| 965470 | 7/1964 | United Kingdom | 418/73 |
| 1131714 | 10/1968 | United Kingdom | 418/73 |

Primary Examiner—John J. Vrablik
Assistant Examiner—Theodore W. Olds
Attorney, Agent, or Firm—Trexler, Bushnell & Wolters, Ltd.

[57] ABSTRACT

The bore of a bearing bush for a gear pump has a first recess located in a zone of load concentration in the bore, the first recess being supplied with a fluid under pressure. A second recess in the bore is located wholly outside the zone in which concentrated loads occur and acts as a reservoir for fluid, to prevent cavitation within the bore as a result of low pressures caused by radical movements of a shaft within the bush. A passage connects the second recess with a zone of lower pressure within the pump.

8 Claims, 3 Drawing Figures

BEARINGS FOR GEAR PUMPS

This invention relates to bearing bushes for use in external gear pumps, that is pumps in which liquid is displaced by the action of two externally meshed toothed gears.

As described in U.S. Pat. No. 3,528,756 which is incorporated herewith by reference the gears of a gear pump are supported in a housing by means of bearing bushes having bores through which the axles of the gears pass, and also having bearing surfaces which abut the end faces of the gears to provide a seal therewith. It is known that, in use, the high pressure at the pump outlet results in the axles of both the driving and driven gears being urged towards the sides of the bores which are adjacent the pump inlet, and provides areas of load concentration within the bushes. The precise area of load concentration may vary with changes in operating conditions of the pump, but remains within a zone, hereinafter referred to as the critical zone, which lies generally at the first quadrant, relative to the direction of gear rotation, from a plane which includes the axes of the meshing gears. This critical zone can readily be observed in a bush which has been dismantled from a normally operated pump. It has been proposed to provide a recess in the bore within the critical zone and to supply this recess with liquid from the pump outlet. Thereby providing a hydrostatic bearing to support the concentrated load and to assist in dissipation of heat.

It is also known from the foregoing reference to provide a passage which communicates with the bore of the bush and which opens on to end faces of the bush, this passage allowing fluid to escape from the bore to a lower pressure zone within the pump housing. As shown in the above reference this passage may comprise a groove which extends along the bore of the bush and opens on to its end faces.

It has been found that as a result of wear on the gears, particularly the appearance of flats on the gear teeth, the gear axle moves relative to the bearing bore, resulting in transient zones of increased clearance between the axle and the bore. Low pressure in these transient zones results in cavitation which causes severe damage to the bearing bush.

It is an object of the invention to provide a bearing bush in which damage from the foregoing causes is substantially reduced.

According to the invention there is provided a bearing bush for a gear pump, said bush having within its bore a first recess which lies wholly within a critical zone of the bore, as hereinbefore defined, a first passage for supplying liquid under pressure to said first recess, a second recess in said bore, and a second passage through which fluid can flow from said bore to a zone of reduced pressure, said second recess and said second passage lying wholly outside said critical zone.

An embodiment of the invention will now be described by way of example only and with reference to the accompanying drawings in which.

Figure 1:
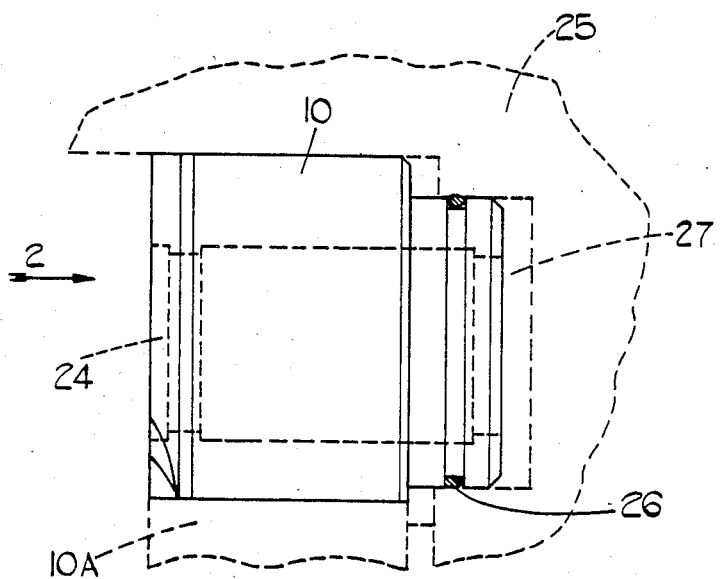
FIG. 1 is a view of a bearing bush for the driven gear of a gear pump.
Figure 2:
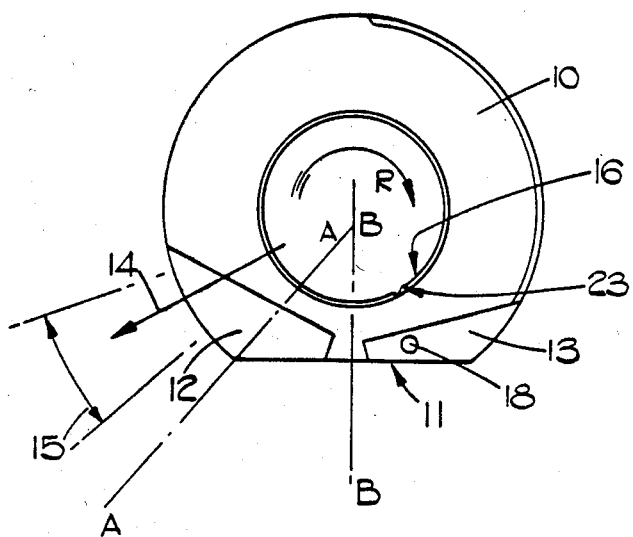
FIG. 2 is a view on arrow 2 in FIG. 1.
Figure 3:
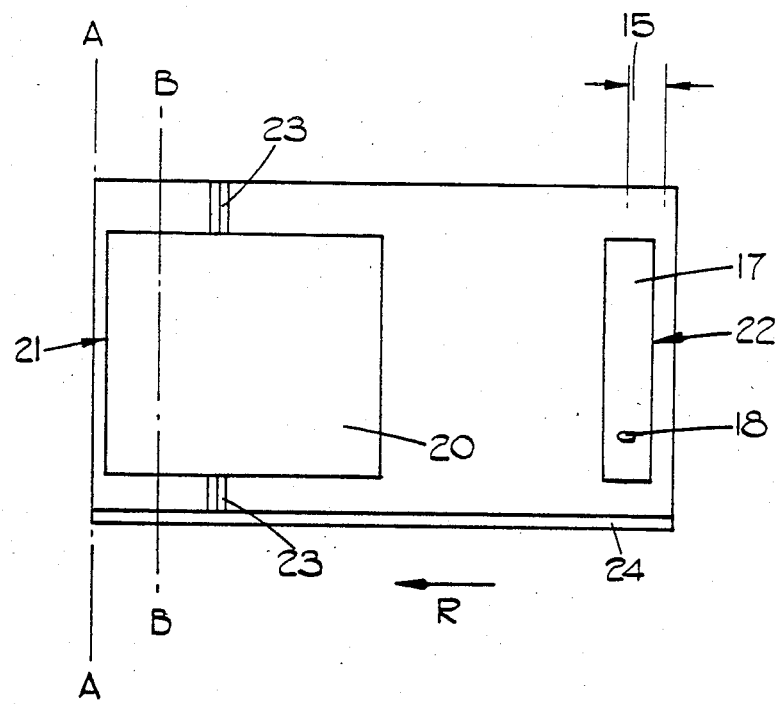
FIG. 3 is a developed view of the bore of the bush, opened at the line A—A in FIG. 2.

A bush 10 for a driven gear is shown in FIGS. 1 and 2. A generally similar bush 10A for a meshing driving gear abuts the gear 10 in a known manner. The bush 10 is generally cylindrical but is provided with a flat 11 which, in use, abuts a corresponding flat on the bush 10A. The line B—B indicates a plane which includes the axes of the two bushes 10, 10A for meshing gears. The bush 10 is provided with cut-outs 12, 13 which respectively communicate with the pump inlet and outlet. Pressure in the pump outlet and reaction between the meshing gear teeth results in a force on a shaft of a gear within the bush 10. The line of action of this force is indicated at 14 and is inclined at 60° to the plane B—B. As a result of changing operating conditions of the pump the direction of the line of action may vary over a critical zone indicated at 15. This zone 15 lies generally in the area of the first quadrant, in the direction of rotation R of a gear within the pump, measured from the plane B—B. For the generality of pumps the zone 15 may be considered as lying between 20° and 100° from the line B—B in the direction of rotation R. In any specific pump the zone 15 has a circumferential extent of approximately 20°, and in the described example extends between 50° and 70° from the plane B—B, for the bush 10 of the driven gear, and between 40° and 60° from that plane in the bush 10A of the driving gear.

Within the bore 16 of the bush is a recess 17 whose length is less than the axial dimension of the bush and which is centred on the mean line of action 14. The recess 17 communicates through a first passage 18 with the cut-out 13 so that, in use, high pressure liquid from the pump outlet is supplied to the recess 17 and provides a hydrostatic bearing adjacent the area of concentrated load. The recess 17 overlaps the critical zone 15, and in the specific example extends between 55° and 80° from the plane B—B. In the example the axial length of the recess 17 is approximately 70% of that of the bore 16, to provide an adequate restriction to flow between the recess 17 and the end faces of the bush 10. The recess 17 has a depth of 1.5 mm. In alternative embodiments the recess 17 may have a circumferential extent of between 20° and 40°.

A further recess 20 in the bore 16 has an axial extent equal to that of the recess 17 but lies wholly outside the critical zone 15. Fluid entering the recess 20 provides a reservoir from which liquid can flow to any transient low pressure zone occurring within the bore 16 as a result of relative movement of the gear axle. Cavitation within the transient low pressure zones is thereby prevented and it has been found that erosion of the bore 16 is virtually eradicated, even following severe tests in which a pump having bushes according to the invention was operated with deliberately mutilated gear teeth.

An end 21 of the recess 20 is spaced by not less than 15° from the closest part of the zone 15. Alternatively, if an adjacent end 22 of the recess 17 lies outside the critical zone 15, the end 21 of the recess 20 will be spaced by not less than 15° from the end 22 of the recess 17. The circumferential extent of the recess 20 is in the present example 160°, but may be between 130° and 190°. The axial extent of the recess is not greater than 70% of the bearing surface of the bore 16, so that if the load of the gear axle is transiently shifted to a direction generally opposite to the line of action 14, the zones of the bore 16 at the ends of the recess 20 will adequately support that load. The depth of the recess 20 is 1.5 mm.

A second passage is constituted by a V-groove 23 which is located approximately 30° from the plane B—B in a direction opposite to the direction of rotation R. The groove 23 opens on to the end faces of the bush 10. In the present embodiment the groove 23 is interrupted by the recess 20, but in other embodiments the groove 23 and recess 20 may be separate. In the present embodiment the groove 23 has two functions, one of which is to supply fluid to the recess 20 from a zone within a counterbore 24 (FIG. 1) in the bush 10 adjacent the end face of the gear therein. Fluid flowing from the counterbore 24 to a zone 27 of reduced pressure within the pump housing 25. This flow prevents excessive increase in the pressure in the zone 24 and also serves to maintain the recess 20 full of fluid.

I claim:

1. A bearing bush for a pump in which rotation of externally meshed gears is accompanied by displacement of a liquid thereby, said bush having a substantially cylindrical bore, said pump including a second bush arranged in parallel with the first-mentioned bush, a first recess in said bore adjacent a critical zone thereof, said critical zone lying substantially in the first quadrant in the direction of rotation of a shaft in said first-mentioned bush, measured from a plane including the axes of the two bushes, a first passage connected to said first recess for supplying a liquid under pressure to said first recess, a second recess in said bore, said second recess lying wholly outside said critical zone and having an axial extent less than the axial extent of said first-mentioned bush, said second recess having ends thereof spaced axially inwards from the opposite ends of said bush, the circumferential extent of said second recess being not less than 130 degrees, said second recess thereby providing a liquid reservoir within said bore, and a second passage for supplying a liquid to said second recess said second passage having a circumferential extent substantially less than that of said second recess.

2. A bearing bush as claimed in claim 1 in which said bush comprises one of two bushes for supporting said externally meshed gears, and said first recess has a circumferential extent of between 20° and 40° and lies within a zone of said bore which extends between 20° and 100°, in the direction of rotation of a gear within the bush, from a plane which includes the axes of both of said gears.

3. A bearing bush as claimed in claim 2 in which said second recess is circumferentially spaced from an adjacent end of said first recess by not less than 15°.

4. A bearing bush as claimed in claim 1 in which said second passage comprises a groove in said bore, and opens on to the end faces of the bush.

5. A bearing bush as claimed in claim 1 in which the axial extent of said second recess is not greater than 70% of the axial extent of said bearing surface.

6. A bearing bush as claimed in claim 1 in which the circumferential extent of said second recess is not greater than 190°.

7. A gear pump having two externally meshed gears supported in a housing by respective bearing bushes, each bush having a substantially cylindrical bore, a first recess in said bore, said first recess having a circumferential extent of between substantially 20 and 40 degrees and lying in a zone of said bore which extends between substantially 20 and 100 degrees, in the direction of rotation of a gear within the bush, from a plane which includes the axes of both gears, a first passage connected to said first recess for supplying a liquid under pressure to said first recess a second recess in said bore, said second recess lying wholly outside said zone and having an axial extent less than the axial extent of said bush, said second recess having ends thereof spaced axially inwards from the opposite ends of said bush, the circumferential extent of said second recess being not less than substantially 130 degrees, said second recess thereby providing a liquid reservoir within said bore, and a second passage for supplying a liquid to said second recess said second passage having a circumferential extent substantially less than that of said second recess.

8. A bearing bush as claimed in claim 2 in which said second recess is circumferentially spaced from an adjacent end of said critical zone by not less than 15°.

* * * * *